418

DRAWING

2 Sheets--Sheet 1.

WILLIAM WALLACE.

Improvement in Carpets.

No. 4,904. Reissued May 14, 1872.

Witnesses, Wm A. Steel
Harry Smith

William Wallace
by his attys
Newson and Lea

AM. PHOTO-LITHOGRAPHIC CO. (CORNE'S PROCESS)

TSMAN'S ROOM
2 Sheets--Sheet 2.
WILLIAM WALLACE.
Improvement in Carpets.
No. 4,904. Reissued May 14, 1872.
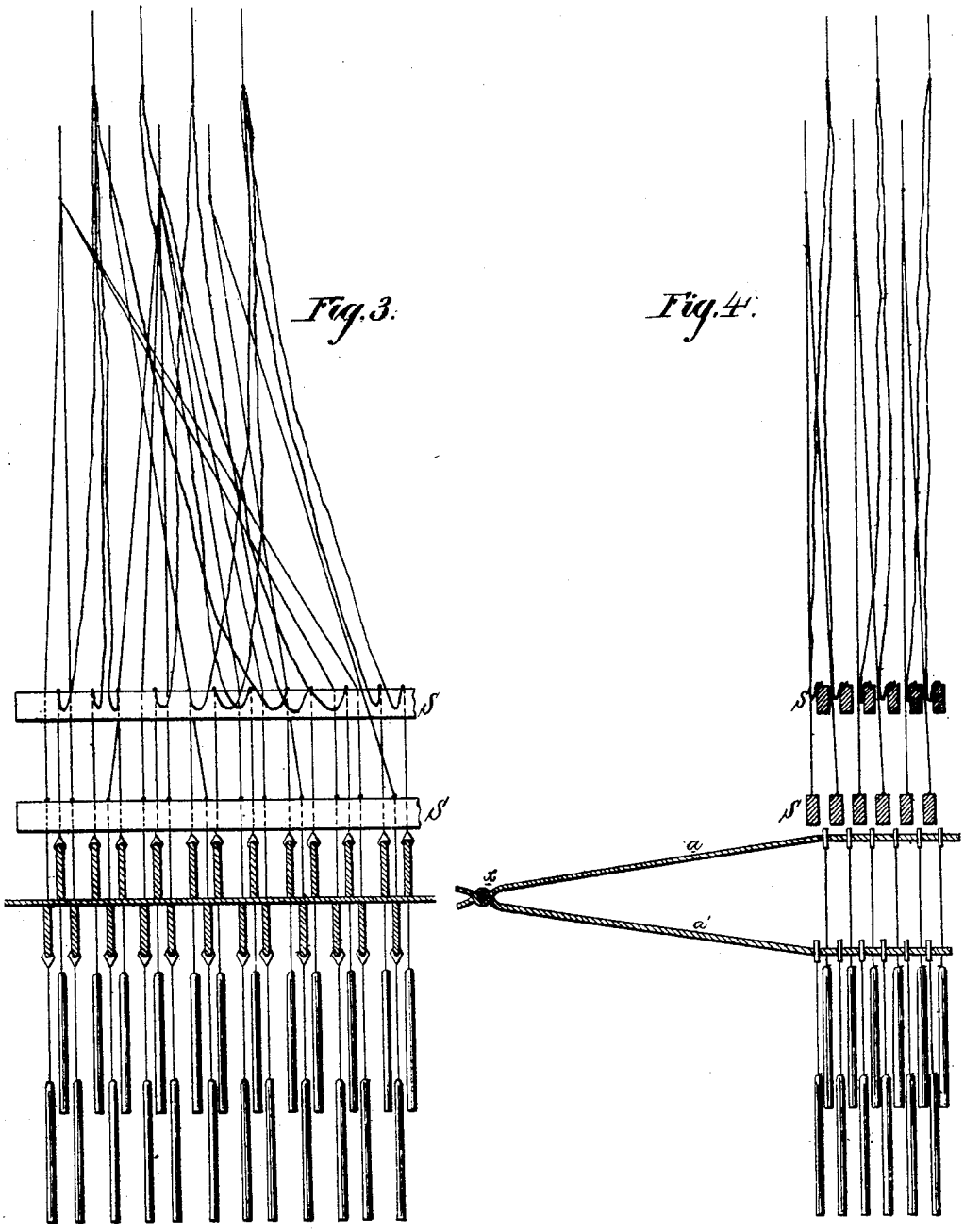
Witnesses { Wm. A. Steel
Harry Smith
William Wallace
by his Attys.
Howson and Son
AM. PHOTO-LITHOGRAPHIC CO. N.Y. (OSBORNE'S PROCESS.)

UNITED STATES PATENT OFFICE.

WILLIAM WALLACE, OF PHILADELPHIA, PENNSYLVANIA, ASSIGNOR TO HIMSELF AND CHARLES McALLISTER, OF SAME PLACE.

IMPROVEMENT IN CARPETS.

Specification forming part of Letters Patent No. 104,232, dated June 14, 1870; reissue No. 4,904, dated May 14, 1872.

Specification describing an Improved Carpet, invented by WILLIAM WALLACE, of Philadelphia, county of Philadelphia, State of Pennsylvania.

*Improved Fabric for Carpets, &c.*

My invention relates to an improvement in the fabrics which, when applied to carpets, are known as damask; and my improved fabric is composed of the warp-threads and alternate thick and thin filling, or weft-threads, usually employed in making carpets of this class, whatever warp-threads are raised for the thick filling being subsequently separated for the reception of the thin filling, as fully explained hereafter, so that the fabric may be more compact in texture, and may have a finer surface than ordinary fabrics of this class, without the consumption of more material than the latter require.

Figure 1:
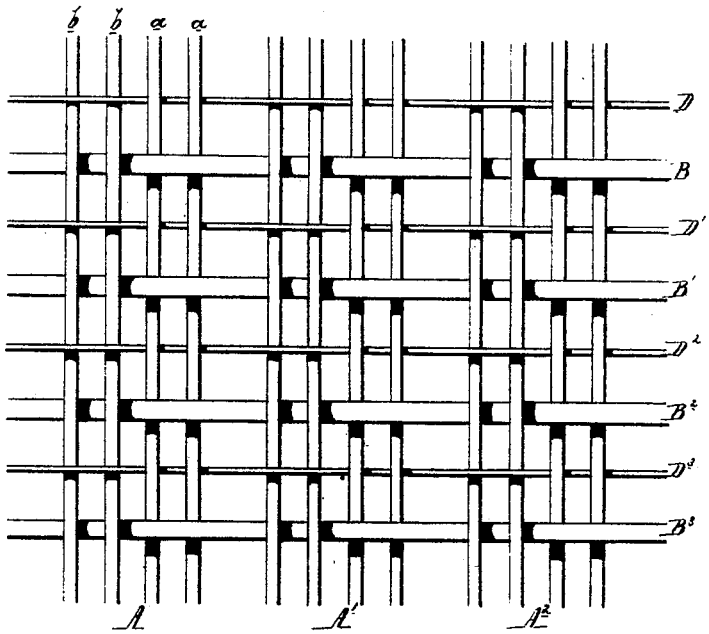
Figure 2:
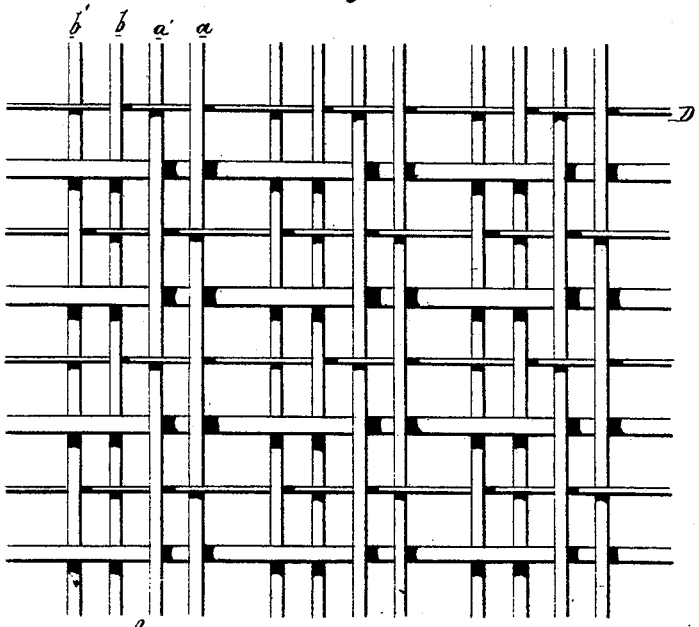

In the accompanying drawing, Figure 1, Drawing No. 1, is a diagram representing the disposal of the threads in making an ordinary damask carpet; Fig. 2, a diagram illustrating the mode of making my improved fabric; and Figs. 3 and 4, Drawing No. 2, are views representing the harness employed in carrying out my invention.

In order that my invention may be more readily understood, I will first proceed to describe the mode of disposing of the weft and warp threads in weaving ordinary damask carpets, reference being had to Fig. 1, Drawing No. 1, which represents a portion of such a carpet, with the threads separated or not beaten up.

The warp of an ordinary damask carpet consists of a series of woolen threads arranged in sets—in the present instance, four threads to each set—these four threads passing through the space of the reed in weaving. Thus, in Fig. 1, A represents one set of four warp-threads; $A^1$, an adjoining set; and $A^2$, a third set. It should be understood, however, that though the term warp-thread is used, each of the threads *a a* and *b b* may consist of more than one strand, according to the quality of the carpet to be produced. These warp-threads are controlled by the usual Jacquard apparatus, which is too well known to need description here. It should be understood, however, that in weaving ordinary damask carpets two warp-threads have been heretofore lifted together, both for the thick filling and thin filling. For instance, the two threads *a a* of the set A have been lifted together, and the same with the two threads *b b* of the same set. The weft-threads consist of a series of thick filling-threads, B, B′, B″, and B‴, and thin filling-threads, D, D′, D″, and D‴, arranged alternately, as shown in Fig. 1, the thick filling-threads serving to impart substance to the carpet, and the thin threads serving to impart strength as binding-threads. It will be observed, on referring to this illustration, Fig. 1, of a common damask carpet, that the thin filling-thread D passes under the two warp-threads *a a* of the set A, and over the two warp-threads *b b* of the same set, the adjoining thick filling-thread B passing over the warp-threads *a a* and under the warp-threads *b b*, and it is this disposal of the threads throughout the fabric, both for the thick and thin filling, which renders the carpet of so open a texture that a lodgment for dust and dirt is afforded, while the threads of one color beneath can be distinguished from above through the interstices between threads of another color; consequently the pattern of the carpet is rendered more or less spotted and unsightly. The aim of my invention, which I will now proceed to describe, has been to overcome this defect of ordinary damask carpets.

On reference to Fig. 2, which illustrates my improved carpet with the threads separated, it will be observed that the warp consists of a series of sets of threads, four threads in each set—in the present instance each thread composed of one or more strands, as circumstances may require, the weft consisting of alternate thick and thin filling-threads; in fact, precisely the same threads may be employed as in making the common damask carpet described above. For the passage of the thick filling-threads the warp-threads are raised, as in the ordinary carpet; but whatever threads are thus raised for the thick filling must be separated for the reception of the thin filling-threads.

Fig. 2, Drawing No. 1, represents the disposal of the threads of my improved carpet.

On reference to this figure it will be observed that the thin filling-thread D passes under the warp-thread *a*, over the warp-thread *a'*, under the thread *b*, and over the thread *b'*, while the adjoining thick filling-thread passes under the two threads *a* and *a'*, and over the two adjoining threads *b* and *b'*. It will now be seen that the difference between the old damask carpet and my improved carpet is simply this. In the former the warp-threads are raised alike for the thick and thin filling, while in the latter whatever threads are raised for the thick filling are separated for the thin filling. This plan of operating the warp-threads involves the necessity of employing peculiar mechanism, for, while the ordinary Jacquard apparatus will serve to raise the threads for the thick filling, other appliances are necessary for operating the single threads for the thin filling.

I will briefly describe the mechanism which I have employed for carrying my invention into effect, reference being had to Drawing No. 2, in which Figs. 3 and 4 show the harness, the lines *a* and *a'* representing the separated warp-threads, and *x* being the point where the weft is beaten up. I dispense with the usual "comber-board" of the Jacquard apparatus, and in place of the same use the twelve shafts S S, all of which are connected to the warp-thread by the harness in the usual manner, and these shafts are controlled by mechanism operated from any working part of the loom independently of the usual Jacquard mechanism, the duty of which is to control the warp-threads for the thick-filling, while the threads to be separated for the thin-filling are controlled by the shafts S and the independent mechanism which operates the same. The harness of the ordinary Jacquard apparatus passes the shafts S freely, but has knots with which the shafts come in contact when elevated.

Different mechanical devices may be employed for carrying my invention into effect; but the above being simple and effective in practice, has been selected to enable those familiar with the art of weaving to understand how my improved carpet can be manufactured. It is this peculiar disposal of the warp-threads in respect to the thick and thin filling-threads which renders my improved carpet more compact in texture, and finer, as regards its surface, than ordinary damask carpets.

Although I have referred to my improved fabric as applied to carpets, it will be evident that it may be used for shawls and other fabrics.

I claim as my invention, and as a new manufacture—

A fabric in which the threads raised in sets of two or more for the thick-filling are afterward separated for the reception of the thin-filling, as set forth.

In testimony whereof I have signed my name to this specification in the presence of two subscribing witnesses.

WILLIAM WALLACE.

Witnesses:
WM. A. STEEL,
HARRY SMITH.